March 16, 1965  J. D. DANNER  3,173,331
TRANSPARENT SLIDE PROJECTOR
Filed Nov. 6, 1961  8 Sheets-Sheet 1

INVENTOR.
JACOB D. DANNER
BY
AGENT.

March 16, 1965

J. D. DANNER 3,173,331

TRANSPARENT SLIDE PROJECTOR

Filed Nov. 6, 1961

INVENTOR.
JACOB D. DANNER
BY
David M. Keay
AGENT.

INVENTOR.
JACOB D. DANNER
BY
David M. Keay
AGENT.

INVENTOR.
JACOB D. DANNER
BY
David M. Keay
AGENT.

March 16, 1965 J. D. DANNER 3,173,331
TRANSPARENT SLIDE PROJECTOR
Filed Nov. 6, 1961 8 Sheets-Sheet 5
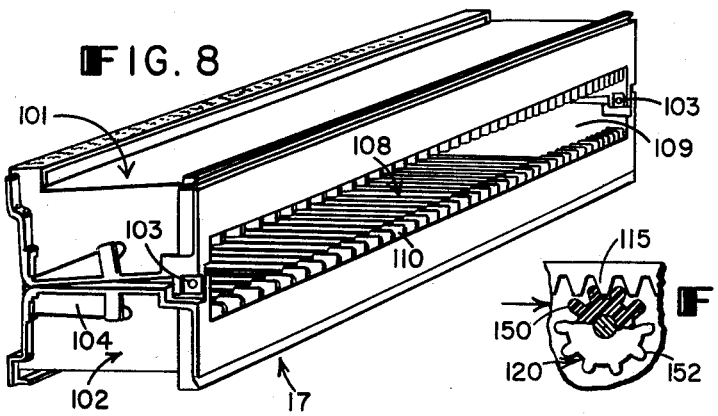
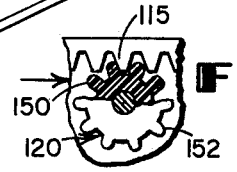
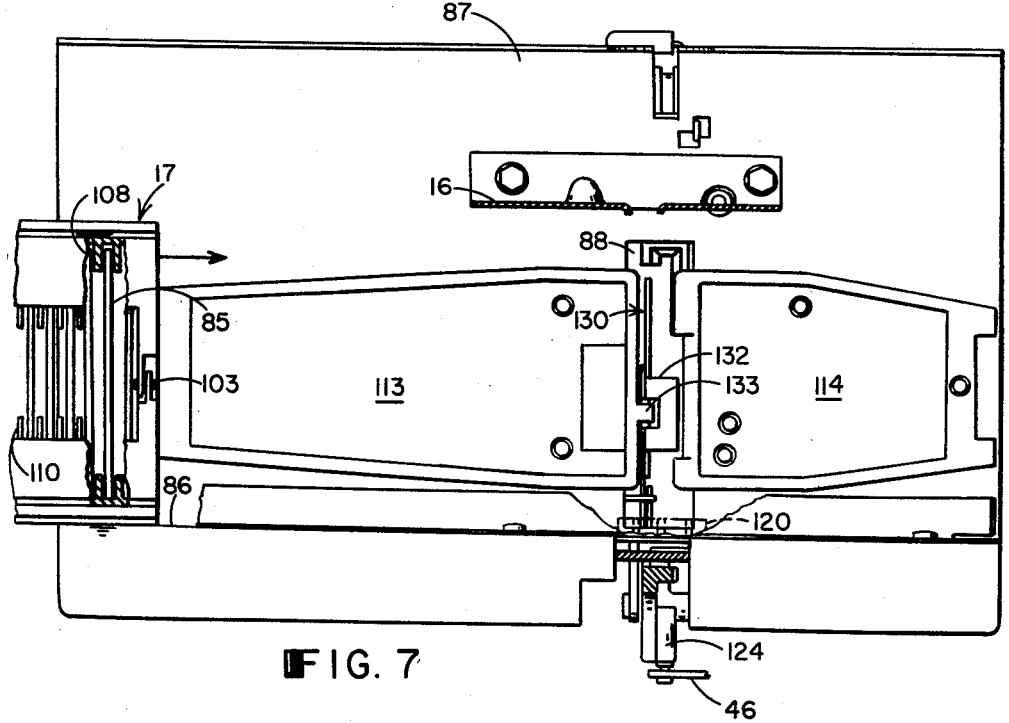
INVENTOR.
JACOB D. DANNER
BY
AGENT.

March 16, 1965          J. D. DANNER          3,173,331
TRANSPARENT SLIDE PROJECTOR
Filed Nov. 6, 1961                            8 Sheets-Sheet 6

INVENTOR.
JACOB D. DANNER
BY
David M. Keay
AGENT.

March 16, 1965  J. D. DANNER  3,173,331
TRANSPARENT SLIDE PROJECTOR
Filed Nov. 6, 1961  8 Sheets-Sheet 7
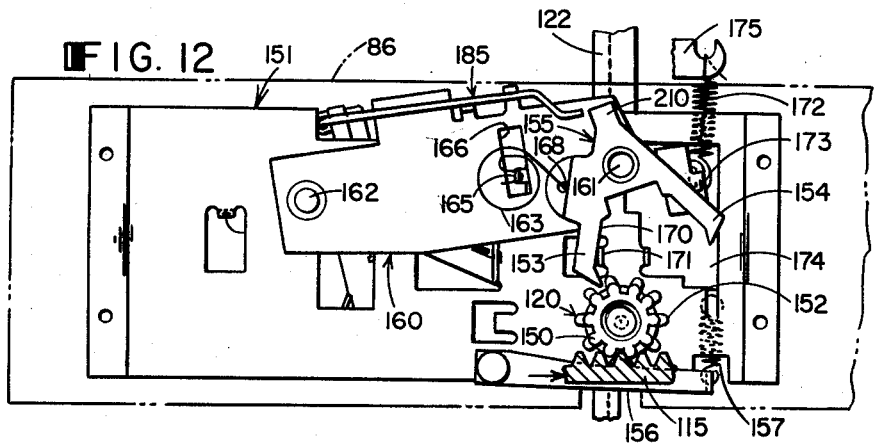
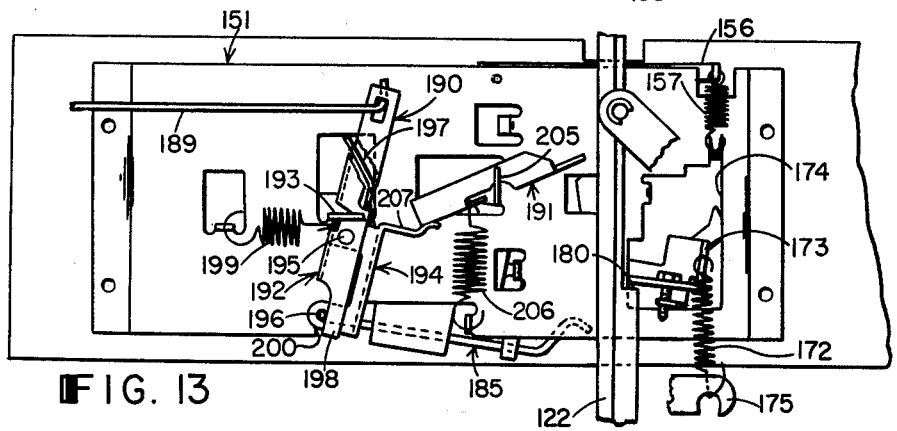
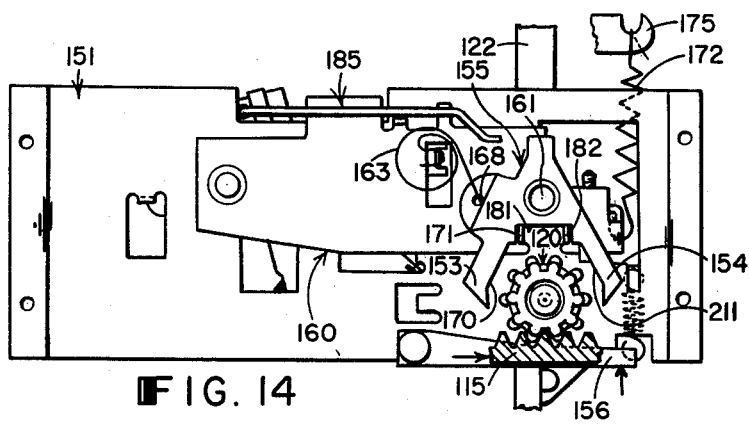
INVENTOR.
JACOB D. DANNER
BY
David M. Keay
AGENT.

March 16, 1965  J. D. DANNER  3,173,331
TRANSPARENT SLIDE PROJECTOR
Filed Nov. 6, 1961  8 Sheets-Sheet 8

INVENTOR.
JACOB D. DANNER
BY
David M. Keay
AGENT.

United States Patent Office 3,173,331
Patented Mar. 16, 1965

3,173,331
TRANSPARENT SLIDE PROJECTOR
Jacob D. Danner, Whitemore Lake, Mich., assignor, by mesne assignments, to Argus Incorporated, a corporation of Delaware
Filed Nov. 6, 1961, Ser. No. 150,296
10 Claims. (Cl. 88—28)

The present invention relates to optical projectors for projecting the image of a transparent slide onto a vewing surface. More particularly, it is concerned with optical slide projectors which are adapted to receive a magazine containing a supply of slides in a predetermined arrangement and to place the slides in projecting position in sequence.

In projectors of this type a slide is moved from the slide magazine into projecting position in the optical train and then returned to its storage position in the magazine by a slide changer. After the slide has been returned to the magazine, the magazine is advanced by a magazine transport or indexing mechanism in order to place the next slide in sequence in position to be moved into projecting position. Generally the action of the slide changer which returns the slide to the magazine actuates the transport mechanism.

Frequently during a showing of the slides in a magazine it is desired to repeat the projection of a previously shown slide. With some projectors, a slide can be reshown only by disengaging the magazine from the transport mechanism and manually shifting the magazine with respect to the projector. Certain projectors, which are currently available, provide means for reversing the action of the magazine transport mechanism in order that a slide may be reshown. However, these projectors may be disadvantageous by reason of requiring a shifting of the mechanism to reverse and then a later reshifting to forward in order to proceed with the projection of the slides in sequence. In addition, the mechanism employed for reversing the operation of the magazine transport mechanism may be complex and add appreciably to the cost of manufacturing the projector.

Therefore, it is an object of the present invention to provide an improved optical slide projector.

It is a more specific object of the invention to provide an improved apparatus for selectively driving a projection slide magazine in the forward or reverse direction.

Briefly, in accordance with the foregoing objects of the invention the magazine transport mechanism in the slide changer of the optical slide projector employs a drive wheel adapted to engage a mating portion of a slide storage magazine so that rotation of the drive wheel through a predetermined angle in one direction moves the magazine a predetermined distance in one direction and rotation of the drive wheel through a predetermined angle in the opposite direction moves the magazine a predetermined distance the opposite direction. A drive wheel rotating means includes an advancing pawl arm for rotating the wheel in one direction and a reversing pawl arm for rotating the wheel in the opposite direction. The drive wheel rotating means is movably mounted on a carrier which is moved from a first terminal position to a second terminal position so as to engage the drive wheel with one of the pawl arms and rotate the drive wheel. A biasing means tends to bias the drive wheel rotating means with respect to the carrier so as to maintain either the advancing pawl arm or the reversing pawl arm in an operative position for rotating the drive wheel. A reversing means is provided for shifting the drive wheel rotating means to remove the advancing pawl arm from an operative position and place the reversing pawl arm in an operative position. When the carrier is moved into the second terminal position, a disengaging means places the drive wheel rotating means in a neutral position with both pawl arms disengaged from the wheel. As the carrier is returned from the second terminal position to the first terminal position, the drive wheel rotating means is biased by the biasing means so as to place the advancing pawl arm in an operative position.

It is a feature of the invention to provide a single, unitary, bifurcated pawl having an advancing pawl arm and a reversing pawl arm for rotating the drive wheel. The pawl is pivotally mounted on the carrier and a biasing spring biases the pawl in an over-center manner which tends to hold the pawl with one of the pawl arms in an operative position and the other pawl arm is an inactive position. The over-center biasing arrangement is such that as the pawl is moved from the neutral position the biasing spring pivots it to place the advancing pawl arm in an operative position and the reversing pawl arm in an inactive position regardless of which pawl arm previously was in an operative position.

It is also a feature of the invention to provide a reverse disabling means which prevents the reversing means from shifting the drive wheel rotating means to place the reversing pawl arm in an operative position except when the slide changer is holding a slide in projecting position across the optical train. The disabling means normally engages the reversing means to prevent its operation, and the disabling means is removed from engagement with the reversing means by an element on the slide changer which engages the disabling means while the slide changer is holding a slide in projecting position across the optical train.

Additional objects, features, and advantages of slide projectors according to the invention will be apparent from the following detailed discussion and the accompanying drawings wherein:

FIG. 2A is a detailed fragmentary view of a collapsible connecting link between the drive motor and the slide transfer carriage of the slide changing mechanism;

FIG. 7 is a side view of a portion of the slide changer showing a slide magazine being inserted into the changer from the rear while the slide transfer carriage is in the slide ejection position;

FIG. 8 is a perspective view of a slide storage magazine which is employed in conjunction with the slide changer;

FIG. 9 is a fragmentary view of the slide magazine from below illustrating the manner in which the slide magazine is engaged by a drive wheel of the magazine transport mechanism;

FIG. 12 is a fragmentary view from above showing a portion of the slide transport mechanism of the slide changer with the pawl set for advancing the slide magazine and with the mechanism about to be actuated by the slide transfer carriage;

FIG. 13 is a fragmentary view from below of the magazine transport mechanism showing the reverse inactivating mechanism at the same instant in an operating cycle as FIG. 12;

FIG. 14 is a view similar to that of FIG. 12 illustrating the pawl in the neutral position after rotation of the drive wheel by a pawl arm, with the slide transfer carriage in the slide ejection position;

*General description*

Figure 1:
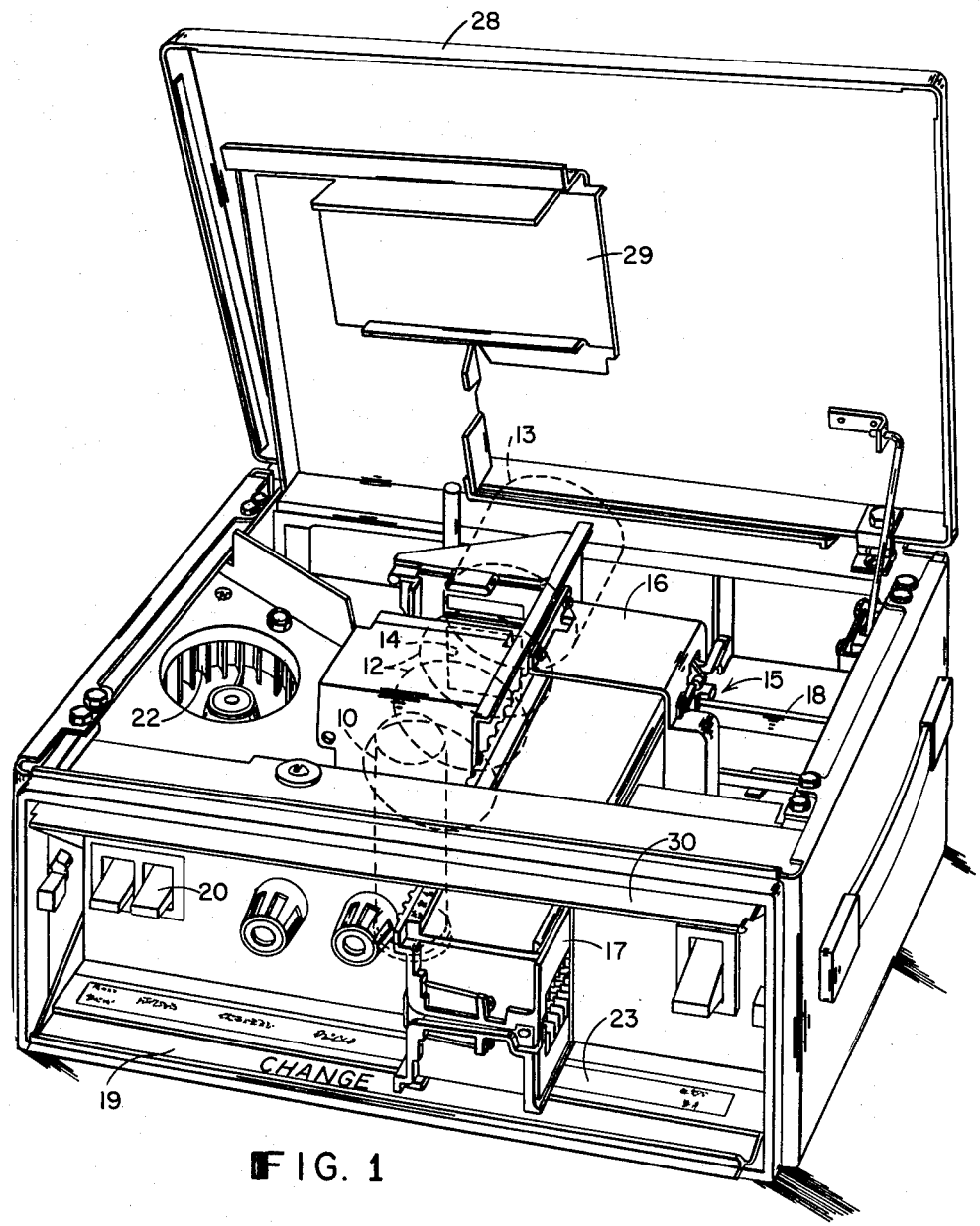
FIG. 1 is a perspective view from the rear, or operator's position, of an optical slide projector according to the invention showing the projector with its top and intermediate covers raised, with the rear doors open, and with a slide magazine inserted in the projector.
Figure 2:
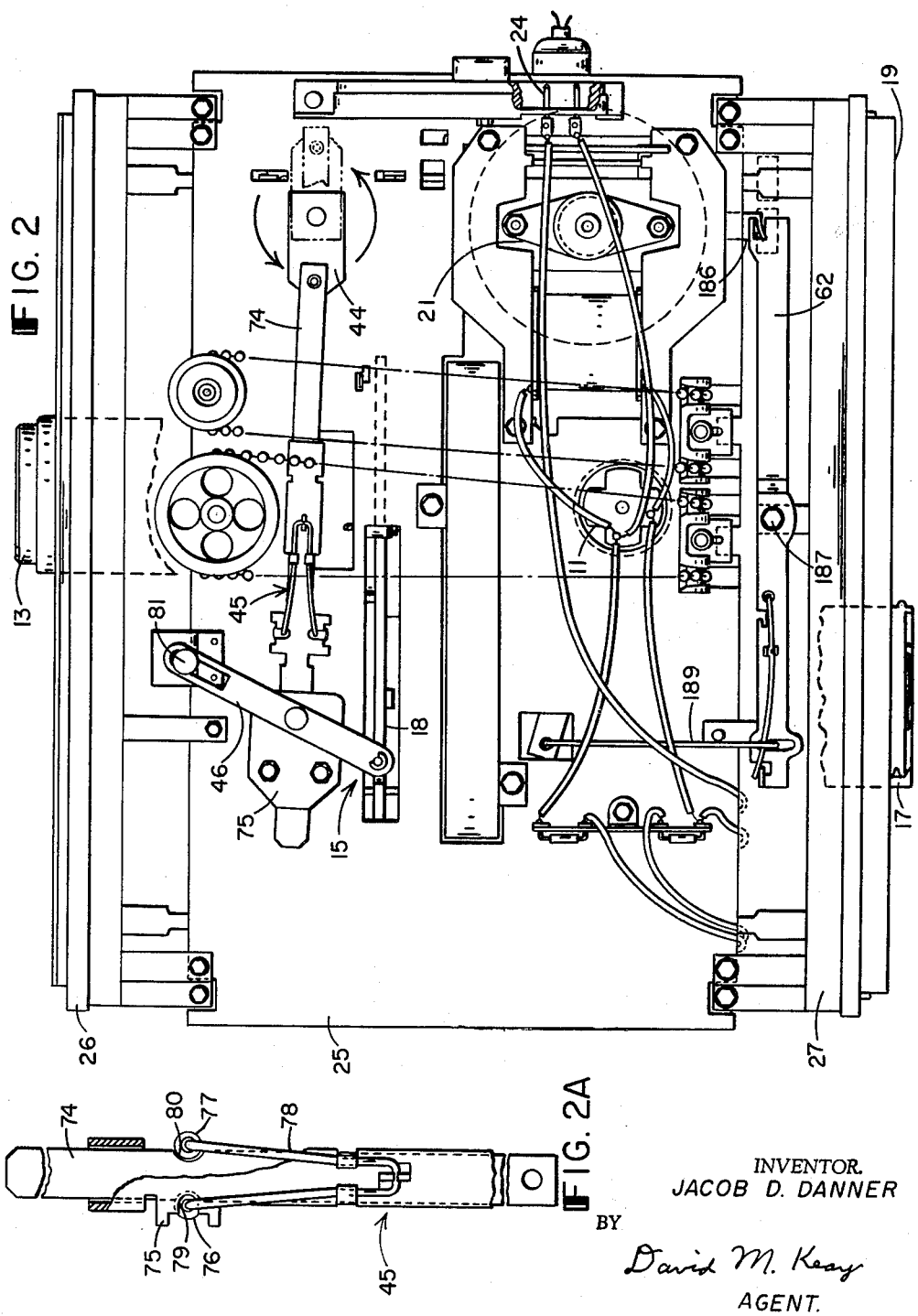
FIG. 2 is a bottom view of the projector with the bottom and side covers removed to show the chassis or main support plate of the projector.

The perspective view of the projector in FIG. 1 together with the bottom view of FIG. 2 illustrate the general arrangement of a slide projector according to the invention. The optical train of the projector includes a projection lamp 10 positioned in a socket 11 and a projecting lens system comprising the lenses 12 of the condenser lens assembly and also the objective lens assembly 13. A projection gate 14 in which a slide is positioned for viewing is located across the optical train between the condenser and the objective lens assemblies. A changer 15 for positioning a plurality of slides in sequence in the projection gate is arranged adjacent the gate. The changer includes a tunnel 16 which is adapted to receive a removable magazine 17 containing a supply of slides arranged in individual compartments along the length of the magazine. A slide transfer carriage 18, only a very small portion of which is visible in FIGS. 1 and 2, moves the slide from the magazine compartment located at a transfer station opposite the gate into the gate for viewing, and subsequently returns the slide to the same compartment. The magazine is then shifted by a magazine transport mechanism, located beneath the tunnel, to position the next slide in sequence at the transfer station opposite the gate. The action of replacing a slide in the projection gate with the subsequent slide is accomplished automatically by the slide changing mechanism during a "change" cycle upon actuation of the "change" treadle 19. If it is desired to reshow the previously projected slide rather than proceed to the next slide in sequence, the "change" cycle is initiated by actuation of the "reverse" button 20. An electric motor 21 drives the slide changing mechanism and also rotates a blower 22 which circulates cooling air throughout the projector. Electrical power for operating the electric motor 21, the projection lamp 10, and an electroluminescent panel lamp 23 is applied at a connector 24.

The various subassemblies of the projector are mounted directly or indirectly on a base member or chassis 25 which extends across the bottom and along the two sides of the projector. Attached to the chassis are a front casting 26 and a rear casting 27. The objective lens assembly 13 is mounted in an opening in the front casting and is moveable along the direction of the axis of the optical train in order that the projected image may be properly focused and so that the objective lens assembly may be withdrawn into the casting for storage. An opening for permitting slide magazines to be placed in or withdrawn from the magazine tunnel is also provided in the front casting. The rear casting 27 has an opening through which magazines may be inserted into the tunnel, and the projector operating controls are mounted on the rear casting. The top cover 28 of the projector is hinged to the front casting so that it may be raised as shown in FIG. 1. The top cover may be in either the open or closed position while the projector is operating. An intermediate cover 29, shown open, is also hinged to the front casting. This cover is ordinarily opened only for maintenance, such as for replacing the projection lamp or cleaning the condenser lenses, and it is closed during operation of the projector in order to obtain proper circulation of cooling air throughout the projector.

Self-storing upper and lower rear doors 30 and 19, shown open in FIG. 1 to provide access to the controls and the magazine tunnel, are closed when the projector is not in use. The doors are mounted on the rear casting in a spring-biased, two-position over-center arrangement so that they will remain in either the closed or the open position. Two similar doors are mounted on the front casting and are open during operation of the projector to permit the transmission of light along the optical train to the viewing screen and to permit the objective lens and the magazine to extend forward beyond the front casting.

*Slide changer driving mechanism*

The slide changing mechanism for moving slides in succession from a magazine to the projection gate and back to the magazine is driven by the electric motor 21 through a gear train, clutch, clutch shaft, and a linkage arrangement which converts the rotary motion of the shaft to reciprocating motion at the slide transfer carriage. The gear train and clutch together with the control arrangement for engaging and disengaging the clutch can best be understood by reference to FIGS. 3, 4, and 5.

The shaft of the electric motor 21 is encircled by a rubber sleeve 31 which bears against the side of a metal disc 32 so as to drive the disc. The blower 22 for circulating cooling air is fastened directly to the same shaft. A gear 33 mounted on the disc engages a speed reducing gear 34 which has a pinion 35 meshing with another gear 36. This gear is fastened to a ratchet gear or wheel 41 of the clutch and the two gears rotate freely on a clutch shaft 42. A clutch disc 43 is rigidly fastened to the clutch shaft and a crank 44, shown in FIG. 2, is fastened to the end of the shaft which extends below the chassis. A collapsible connecting link 45 and cross-arm 46, which can best be seen in FIG. 2, complete the linkage arrangement to the slide transfer carriage.

Figure 5:
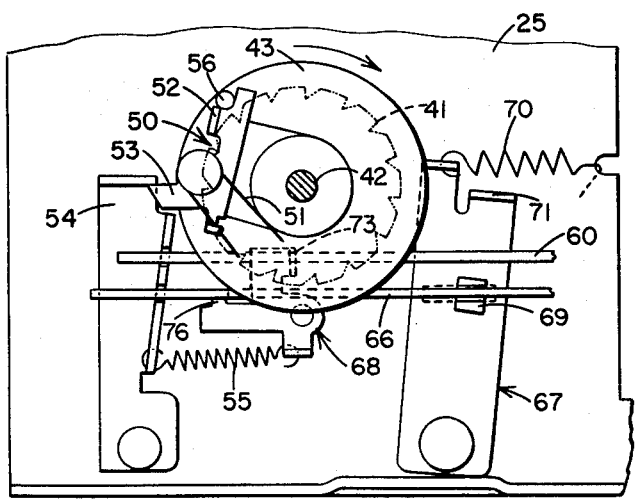
FIG. 5 is a top view of the clutch taken generally along line 5—5 of FIG. 3 and illustrating details of the clutch and control mechanism associated with it.

The ratchet gear 41 and the clutch disc 43 together with a pawl 50 mounted on the clutch disc provide a clutch which enables the continuously rotating motor to rotate the clutch shaft intermittently as can be most clearly understood by reference of the detailed view of FIG. 5. An arrangement of stops and control rods permits the operator selectively to engage the clutch so that it is automatically disengaged after the clutch shaft has rotated through one complete revolution or through one half of a revolution to place the crank in either of two predetermined positions.

The connection between the ratchet gear 41, which is the driving member of the cltuch, and the clutch disc 43, which is the driven member, is accomplished through the pawl 50 which is pivotally mounted on the disc. The pawl is biased by an eye-spring 51 in a manner tending to urge an ear 52 of the pawl into the path of the continuously rotating ratchet gear. When the pawl is engaged by the ratchet gear, the clutch disc, clutch shaft, and crank rotate with the ratchet gear.

The clutch is disengaged and rotation of the clutch shaft stopped by pivoting of the pawl away from the ratchet gear against the action of the eye-spring 51. This pivoting action is accomplished when an arm 53 of the pawl strikes against a stop 54 interposed across the path of rotation of the arm. The rotating motion of the clutch disc and the arm 53 as it strikes the stop causes the pawl to pivot with respect to the disc and release the ear 52 from the teeth of the ratchet gear. The pawl pivots only until a portion of the pawl contacts a boss 56 on the clutch disc. Although the ratchet gear continues to rotate, the clutch disc is positively stopped in a predetermined position as illustrated in FIG. 5.

The stop 54 is pivotally mounted on the chassis and is normally biased by a spring 55 so as to be in position to intercept the arm of the pawl. Thus, the positions of the clutch disc and the shaft are normally as illustrated in FIG. 5. These positions are the so-called "full cycle" positions of the disc and the shaft, and the stop 54 in the full cycle stop. When the disc and shaft are in the full cycle position, the crank 44 is also in the full cycle position which is illustrated in phantom in FIG. 2.

In order that the pawl may engage the ratchet gear to rotate the clutch disc and shaft, the full cycle stop 54 is withdrawn so as to release the arm 53 and permit the eyespring 51 to pivot the pawl and move the ear 52 into engagement with the rotating ratchet gear. The stop 54 is pivoted to free the pawl by movement of a "change" or "full cycle" control rod 60 in the forward direction toward the front of the projector. The edge of a cutout in the rod engages a portion of the stop so that movement of the rod pushes the stop free of the pawl arm 53.

The "change" control rod 60 is moved forward by depressing the "change" treadle 19 or the "reverse" button 20. The "change" treadle is the lower rear door of the projector and when it is depressed beyond its normal open position against the action of a door stop spring 61, its lower edge pushes against the control rod and moves it forward. Actuation of the "reverse" button first changes the setting of the magazine transport mechanism through the reverse lever 62 in a manner to be explained hereinafter, and then a portion of the button pushes against an extension 63 of the control rod and moves the rod forward. When the treadle or button is released, the full cycle stop spring 61 causes the stop to return to its normal position in the path of the rotating pawl arm 53 so that the disc and shaft will be stopped in the full cycle position. Thus, momentary actuation of the "change" treadle or "reverse" button permits one complete revolution of the clutch disc, shaft, and crank.

When operating the projector, it is also important to be able to rotate the clutch disc and shaft through one-half of a revolution and stop them at a "half cycle" position, 180° from the full cycle position shown in FIG. 5. The half cycle position of the crank is illustrated by the full line showing in FIG. 2. Rotation of the disc from the full to the half cycle position is initiated by depressing a control button 64 mounted on the rear casting 27. The button pivots, and pushes a half cycle control rod 66 toward the front of the projector. This rod cooperates with the full cycle stop 54, a half cycle stop 67, and a latch 68 so as to permit the clutch to be engaged and then disengaged when the disc has been rotated to the half cycle position.

The half cycle rod has a protrusion which engages the half cycle stop 67, at an opening 69 in the stop. The stop is pivotally mounted on the chassis and is normally biased clear of the clutch disc and pawl by a spring 70. The half cycle control rod is cut away to provide an edge which bears against a portion of the full cycle stop 54 upon forward movement of the half cycle control rod. When the half cycle control rod is pushed forward against the action of the spring 70, the full cycle stop releases the pawl 50 permitting the clutch disc and shaft to rotate. This movement of the half cycle control rod also moves the half cycle stop into position whereby an arm 71 of the stop intercepts the rotating pawl arm and stops the disc, shaft, and crank in the half cycle position.

Both the half and full cycle stops are held in the positions described above by the action of the latch 68 after the half cycle control rod is released. The latch tends to be pivoted about its mounting on the chassis by the spring 55, but it is normally held in the position shown in FIG. 5 by an ear 72 of the latch which bears against the surface of the half cycle control rod. When the half cycle control rod is moved forward, however, the ear drops into a cutout in the rod. Although the half cycle stop spring 70 tends to move the stop and the rod rearward, the edge of the cutout in the rod abouts the ear of the latch and thus movement of the rod and stop is prevented.

In order to release the clutch disc and shaft from the half cycle position and return them to the full cycle position, the full cycle control rod is moved forward, usually by depressing the "change" treadle. The edge of a cutout in the full cycle rod strikes a tab 73 on the latch 68 and pivots the latch sufficiently to move the ear 72 out of the cutout in the half cycle rod. The half cycle stop spring 70 then causes the stop 67 and the half cycle rod to return to their normal rearward positions. The clutch pawl 50 is thereby released from the half cycle stop and is pivoted by the eye-spring 51 so that the ear 52 engages the continuously rotating ratchet gear 41 and the clutch is engaged. The full cycle stop 54 also returns to its normal position under the action of the spring 55 after the half cycle rod has been disengaged from the latch and the "change" treadle is released. The full cycle stop then intercepts the pawl arm and stops the disc, shaft, and crank in the full cycle position.

The linkage arrangement between the intermittently rotating crank 44 and the reciprocating slide transfer carriage 18 of the slide changer is best seen in FIG. 2. The full-line showing in FIG. 2 of the crank and linkage illustrates the positions they assume when the clutch is in the half cycle position. The crank and the end portion of the collapsible connecting link 45 are also shown, in phantom, in the full cycle position.

Pivotally attached to the crank is a rod 74 of the collapsible connecting link 45, details of which are shown in the fragmentary view of FIG. 2A. A slide 75 which is slidable along the length of the rod is normally held in a fixed position with respect to the rod by a detent arrangement. Rollers 76 and 77 which are carried by a spring 78 mounted on the slide are biased toward each other and bear against the edges of the rod. The rollers mate with notches 79 and 80 in the edges of the rod. This detent arrangement normally holds the rod and slide in a fixed relationship as shown in FIGS. 2 and 2A, but any excessive stress between the slide and the rod along the length of the rod forces the rollers out of the notches and the slide and rod slip with respect to each other. Movement of the rod after the stress has been removed permits the rollers to re-enter the notches and re-establish the normal fixed relationship between the rod and slide.

A cross-arm 46 connects the slide of the collapsible connecting link to the slide transfer carriage 18 by pivot connections to the carriage and the slide and a pin and slot connection 81 to the chassis. The linkage arrangement thereby converts the rotary motion of the shaft and crank to reciprocating motion at the slide transfer carriage 18, and the collapsible connecting link 45 isolates the shaft and carriage from each other thus preventing damage in the event of a jam or other stress occurring in the driving mechanism.

*Slide changer and projection gate—general description*

The slide projection gate and the slide handling portions of the slide changer are illustrated in detail in FIGS. 6, 7, 10, and 11. The slide changer is driven by the motor through the gear train, clutch, and linkage arrangement successively to place the slides stored in a magazine in the projection gate for viewing. The changer includes a tunnel 16 which is adapted to receive a slide magazine 17 containing a supply of slide 85 to be viewed. The tunnel has a floor 86 which extends the full length of the projector between the openings in the front and rear castings. A side wall 87 which separates the magazine tunnel from the optical train similarly extends the length of the projector. An opening 88 in the side wall opposite the gate, as seen in FIG. 7, permits slides to be moved from a magazine in the tunnel to the projection gate and back to the magazine by the slide transfer carriage 18.

The projection gate itself is comprised of an apertured plate 90 having upper and lower slide supports 91 and 92 for holding a slide. The aperture in the gate normally is aligned with an aperture in a gate support plate 93. The support plate is attached to the side wall 87 and both apertures lie along the optical train. The gate 90 fits slidably between two vertical guides 94 and 95 and the gate support plate on which the guides are mounted. The entire gate 90, including the slide supports 91 and 92, is thus moveable from its projecting position across the optical train to a raised position at which the slide may be removed from the gate for editing. The aperture in the support plate is blocked by a shutter 100 in order to prevent the transmission of light along the optical train except when a slide is in projecting position in the gate. More complete details concerning the projection gate and additional features related thereto for providing a slide editing arrangement may be had by reference to application, Serial Number 150,407, entitled Slide Projector With Movable Gate for Editing Purposes, filed November 6, 1961, by Clarence G. Hillegonds and William B. Pester and assigned to the assignee of the present invention.

Slide magazine

A storage magazine 17 for holding a supply of transparent slides 85 is comprised of two generally similar body members 101 and 102 which are pivotally connected together as by means of a rivet 103 at each end as can best be seen in the perspective of FIG. 8. Springs 104 mounted on the two members at each end of the magazine tend to bias the body members toward each other about the pivot connections. The magazine has a solid top 105 and bottom 106, as viewed when in position in the tunnel, and an open side 107 through which slides are introduced and withdrawn, as can be seen from the cross section views of the magazine in FIGS. 6 and 10. The interior of the magazine is divided transversely into a plurality of slide compartments by partitions 108 which are integral with each body member and extend toward each other from the top and the bottom. The side of the magazine opposite the open side has an opening 109 along its length into which portions of the partitions 110 extend. Longitudinal ridges 111 and 112 along the body members at the open side of the magazine serve to block the open side sufficiently to prevent slides from inadvertently dropping from the magazine except when the size of the opening is increased by pivoting the body members in opposition to the springs 104.

In order to enlarge the opening along the open side of the magazine sufficiently for slides to be withdrawn and reinserted by the slide transfer carriage while the magazine is in the changer, magazine opening cams 113 and 114 are located on the side wall 87 of the tunnel as illustrated in FIG. 7. The upper and lower surfaces of the cams diverge in the vicinity of the side wall opening so that as a magazine is inserted into the tunnel, from either the rear or the front, the body members are pivoted open by the cam surfaces sufficiently to permit the movement of slides through the open side. The magazine also has a rack gear 115 of one tooth per slide compartment along the inside of the bottom edge for engagement with an indexing drive wheel 120 of the magazine transport mechanism as can be seen in FIG. 9 and also in FIG. 12.

More complete details concerning the magazine and its manner of cooperating with the changer may be had by reference to application, Serial Number 150,482, entitled "Projector and Transparent Slide Storage Magazine Therefor," filed November 6, 1961, by Jacob D. Danner and assigned to the assignee of the present invention.

Slide transfer carriage

The slide transfer carriage 18 of the changer transfers the slides 85 between the magazine compartments and the projection gate through the opening in the side wall. The entire carriage is reciprocated from the slide ejection position shown in FIG. 6 to the slide injection position shown in FIG. 10 by the slide changer driving mechanism. The linkage arrangement of the driving mechanism places the carriage in the slide ejection position when the clutch and crank are in the half cycle position and places the carriage in the slide injection position when the clutch and crank are in the full cycle position.

The body of the carriage is a yoke 121 having a horizontal bar 122 disposed transversely of the optical train and lying below the tunnel and the aperture of the gate. The bar is slidably mounted for transverse movement in a guide 123 attached to the gate support plate 93. A boss 124 on the bottom of the bar 122 is pivotally connected to the cross-arm 46 of the driving mechanism in order that the carriage may be reciprocally driven. An injector arm 125 and an ejector arm 126 extend toward each other from vertical supports 127 and 128 at opposite ends of the bar. The inner edge of the injector arm is adapted to fit into the compartment of a magazine and to push the slide from the compartment, through the opening in the side wall of the tunnel, and into the slide supports 91 and 92 of the gate. The entrances to the supports are appropriately flared to receive a slide and the bottom support contains a spring loaded pad. The slide is thus readily pushed into the gate and is positioned firmly for proper projection.

The ejector arm 126 carries an ejector plate 130 which is biased toward the injector arm by a spring 131. When the yoke is moved from the injection position of FIG. 10 toward the slide ejection position of FIG. 6 a portion 132 of the ejector plate extending transverse to the main portion of the plate, as shown in FIG. 7, pushes the slide out of the gate and back into its magazine compartment. As the ejector plate reaches the tunnel side wall, as illustrated in FIG. 7, it strikes a stop 133 and its further movement is prevented while the yoke continues to move. In this position the ejector plate returns the slide to its compartment and the transverse portion lies athwart the opening 88 in the side wall so as to block the opening.

Shutter

Figure 6:
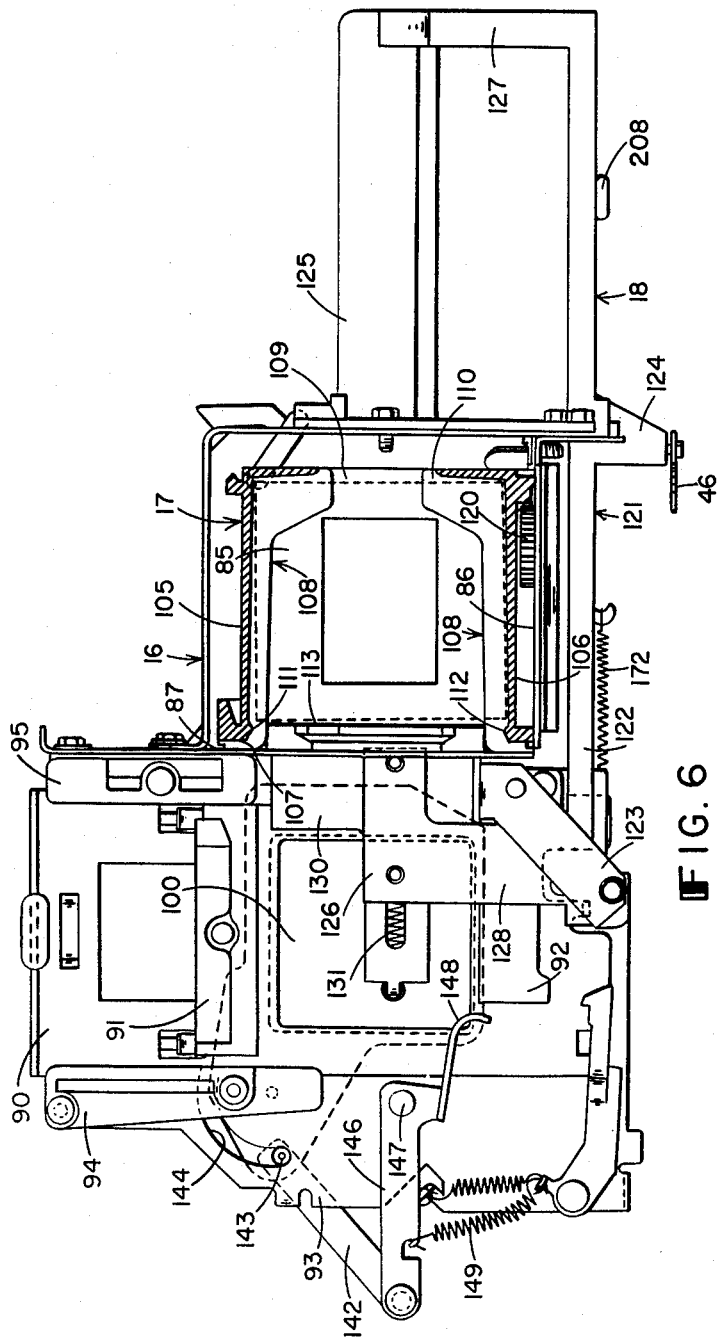
FIG. 6 is a view from the rear illustrating the slide changer and projection gate of the projector and showing a slide magazine in cross section in position in the changer, the slide transfer carriage of the slide changing mechanism being shown in the slide ejection position.

As a slide is moved from the magazine to the projection gate the last portion of that movement causes the normally closed shutter 100 to open. The shutter is pivotally connected by pin 140 to the front of the gate support plate 93 as can best be seen in FIG. 11. A point on an arm 141 of the shutter is pivoted at the end of a connecting link 142, and the pivot connection 143 tends to move along an arcuate slot 144 in the gate support plate, the center of the arc being the pivot point 140 of the shutter. A trigger arm 146, as best seen in FIG. 6 is pivoted on the back of the gate support plate at 147. A trigger cam 148 at one end of the trigger arm extends into the region occupied by a slide when the slide is in the projecting position across the optical train. The other end of the trigger arm is pivotally connected to the connecting link 142. A shutter spring 149 biases the trigger arm in a counter-clockwise direction about its pivot point 147 as seen from the rear, FIG. 6. This action tends to hold the pivot connection 143 between the shutter arm and the link 142 at the bottom of the arcuate slot 144, thus holding the shutter in its closed position blocking the path of light from the lamp through the gate.

Figure 10:
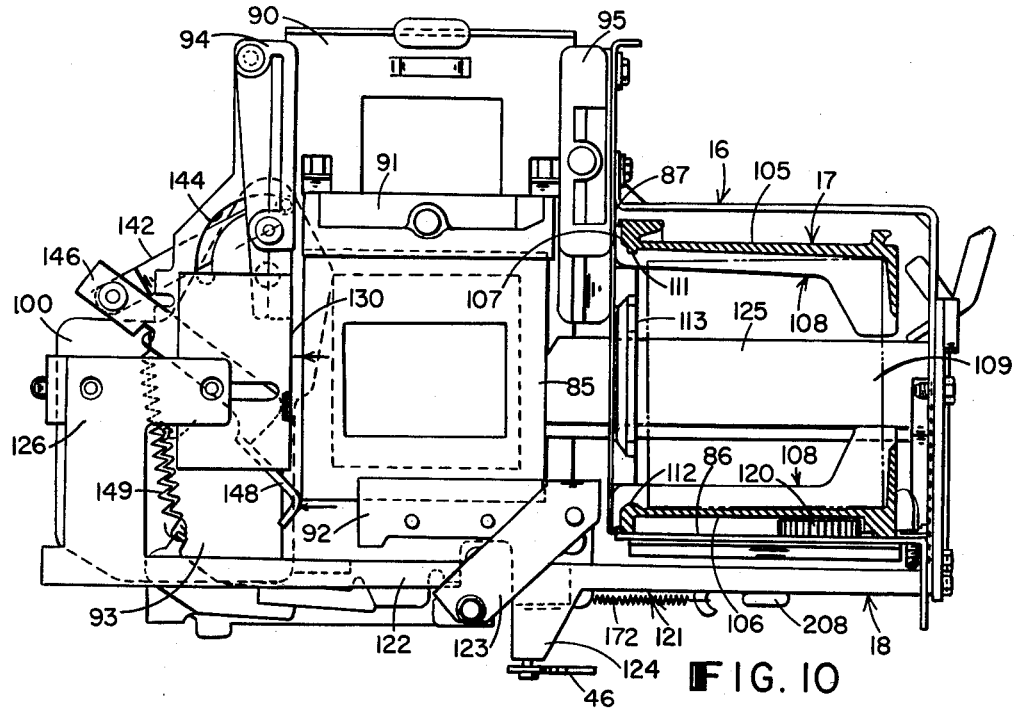
FIG. 10 is a view similar to that of FIG. 6 showing the slide transfer carriage in the slide injection position and a slide in position in the projection gate.
Figure 11:
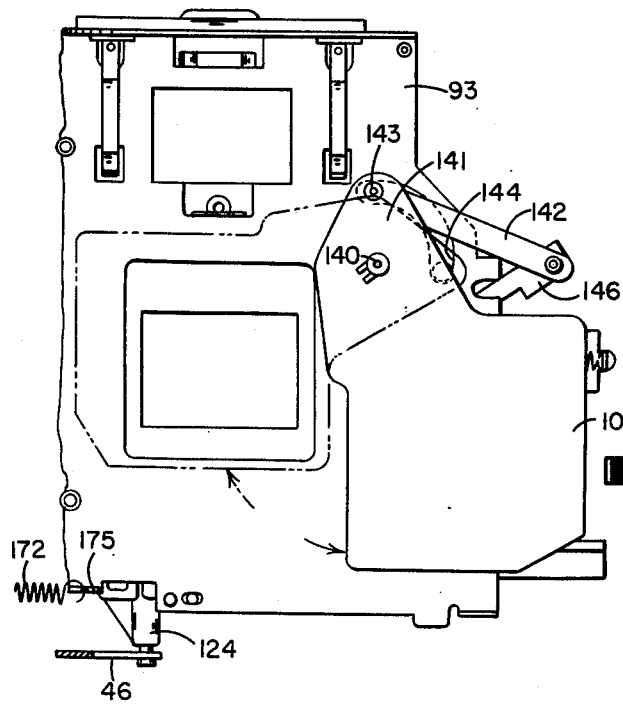
FIG. 11 is a fragmentary view of the slide projection gate from the front of the projector illustrating the shutter for blocking the passage of light along the optical train.

As can be seen from FIG. 10 when a slide is moved into projecting position in the gate, the slide itself contacts the side surface of the cam 148 of the trigger arm 146. Continued movement of the slide displaces the cam downward and along the direction of movement of the slide thus pivoting the trigger arm in a clockwise direction, as seen in FIG. 10, aganist the action of the shutter spring 149. Through the connecting link 142 the pivot connection 143 of the link to the shutter is moved to the upper end of the arcuate slot 144 thus pivoting the shutter to its open position as shown in FIG. 11.

When the slide transfer carriage moves from the slide injection position of FIG. 10 toward the slide ejection position of FIG. 6, the ejector plate 130 pushes the slide out of projecting position as explained hereinabove. The first portion of this motion moves the slide clear of the trigger cam and permits the trigger arm to pivot under the action of the shutter spring. The shutter linkage thereby closes the shutter blocking the transmission of light along the optical train until the next slide is moved into projecting position and displaces the cam.

*Magazine transport mechanism—general*

After a slide has been returned from the gate to its magazine compartment by the slide transfer carriage, the slide magazine automatically is advanced a distance equal to the length of one slide compartment by the magazine transport mechanism in order to place the next slide in sequence in the slide transfer station opposite the projection gate. Alternatively, the transport mechanism may be set, while the slide is still in the projection gate, so that after the slide has been returned to its magazine compartment the magazine is fed backward one compartment, rather than forward. The magazine transport or indexing mechanism and portions of the linkage arrangement through which the mechanism is set for reverse is illustrated in the partial views of FIGS. 12 through 16.

The slide magazine 17 has a row of gear teeth, one tooth for each slide compartment, arranged along the inside of the bottom edge to form a rack gear 115, a fragment being shown in FIG. 9 and also in cross-section in FIG. 12. The rack teeth mesh with the gear teeth 150 of an indexing drive wheel 120, a portion of which protrudes above the floor 86 of the tunnel. (See FIG. 6 or 10.) The indexing drive wheel is mounted on the base plate 151 supporting the mechanism for rotation about a vertical axis. The wheel is rotated from one position to the next through an angle equal to the angle between adjacent gear teeth to cause the magazine to index a distance equal to the length of one slide compartment. A second set of teeth 152 on the wheel lies below the level of the tunnel floor. There is one tooth in the second set for each tooth in the first set. Either an advancing arm 153 or a reversing arm 154 of a bifurcated indexing pawl 155 is pushed against a tooth of the second set 152 in order to rotate the wheel in one direction or the other. The wheel is halted in precise position after each index by means of a detent 156 having a protrusion for engagement of the spacers between the second set of teeth 152 through the influence of a detent spring 157.

*Magazine advancing*

The indexing drive wheel 120 is rotated in a direction to feed the magazine forward, from the rear toward the front of the projector, by the advancing pawl arm 153 which is shown in FIG. 2 in an operative position. The wheel is rotated by movement of the advancing pawl arm 153 as it pushes against a tooth of the lower set of drive wheel teeth 152 and rotates the wheel against the force of the detent spring 157 until the detent 156 snaps into the next space between two adjacent teeth. The reversing pawl arm 154 is positioned so as to be inactive whenever the advancing pawl arm is operative.

The indexing pawl 155 is pivotally mounted on a pawl carrier 160 at pivot 161 and the carrier, in turn, is pivotally mounted on the base plate 151 by a pin 162. A pawl spring 163 has a portion bearing against a stud 165 which extends from the base plate through an opening 166 in the carrier. An end of the spring bears against the pawl at a connecting point 168 which lies along the advancing arm. Since the connecting point on the pawl lies on one side of the dead-center line between the pivot of the pawl and the portion of the spring bearing against the stud on the base plate, the spring tends to bias the pawl in the counterclockwise direction as viewed in FIG. 12. The inner edge 170 of the advancing pawl arm contacts a cam 171 fixed to the base plate, thus limiting the amount of rotation of the pawl.

The pawl carrier 160 is normally biased to an initial or first terminal position away from the indexing drive wheel as illustrated in FIG. 12 by a carrier spring 172. One end of the spring is fastened to an arm 173 of the carrier which extends below the base plate 151 through an opening 174 in the plate as can best be seen in FIG. 13. FIG. 13 shows the transport mechanism at the same instant in an operating cycle as illustrated in FIG. 12. The other end of the carrier spring is fixed to a tab 175 of the gate support plate.

The pawl carrier 160 is moved from its first terminal position toward the indexing wheel to a second terminal position which is shown in FIG. 14, by the horizontal bar 122 of the slide transfer carriage. As can be seen in FIG. 13, the edge 180 of a portion of the bar is disposed so as to contact a portion of the carrier arm 173 which extends below the base plate so that the carrier is moved along with the bar. In FIG. 13, and also in FIG. 12, the edge 180 of the bar is shown about to contact the carrier arm. This situation occurs during the last portion of the movement of the slide transfer carriage toward the slide ejection position after the ejector plate has pushed the slide from the projection gate into its magazine compartment and the injector arm has moved clear of the magazine.

As the slide transfer carriage completes its movement toward the slide ejection position and moves the pawl carrier toward its second terminal position, the indexing pawl 155 is moved toward the indexing drive wheel. During movement of the carrier and pawl the pawl spring 163 tends to keep the pawl biased operatively in the counterclockwise direction as viewed in FIG. 12. When the tip of the advancing pawl arm 153 engages a tooth of the second set of teeth 152 on the wheel, the moving pawl arm turns the wheel in the counterclockwise direction. As the pawl continues to move, the wheel is rotated sufficiently so that the detent 156 snaps into the next position on the wheel. Rotation of the wheel is translated into longitudinal motion of the slide magazine through the rack and gear arrangement of the magazine and the first set of teeth on the wheel. Further movement of the carrier and pawl causes a portion of the inner edge 170 of the pawl arm to bear against the cam 171 pivoting the pawl in a clockwise direction. The pawl arm is thus disengaged from the teeth of the wheel and then cammed into position so that a notch 181 in the pawl mates with the cam 171 and with a second cam 182, preventing further movement or rotation of the pawl.

When the slide transfer carriage reaches the slide ejection position, the pawl carrier 160 and the pawl 155 reach the second terminal position as shown in FIG. 14. The notch 180 in the pawl is engaged by the cams 171 and 182 thus holding the pawl in a neutral position. During an ordinary slide changing cycle this position is assumed only momentarily while the carriage is in the slide ejection position, before the carriage starts its return to the slide injection position carrying the next slide from the magazine into the projection gate. If, however, the half cycle control button has been actuated to move the slide transfer carriage from the slide injection position, the carrier 160 remains in the slide injection position as previously described. The magazine may then be moved freely either forward or backward in the tunnel with no interference from the magazine transport mechanism other than the positioning action of the detent 156.

When the slide transfer carriage returns toward the slide injection position and the edge 180 of the horizonal bar is withdrawn, the carrier spring 172 causes the pawl carrier to return to its first terminal position as seen in FIG. 12. As the notch 181 in the indexing pawl is disengaged from the cams 171 and 182, the pawl spring 163 pivots the pawl in the counterclockwise direction as viewed in FIGS. 12 and 14. The spring biases the pawl in this direction because the end of the spring pushes against the pawl at the connecting point 168 which lies counterclockwise on the pawl from the critical dead-center position between the pivot point of the pawl and the portion of the spring bearing against the base plate.

During the return movement of the carrier and pawl, the tip of the advancing pawl arm 153 strikes a tooth of the lower set of teeth of the drive wheel. However, the configuration of the tooth and the tip together with the relative strengths of the pawl spring and detent spring are such that the pawl pivots sufficiently for the arm to ride over the tooth without rotating the wheel. The pawl spring 163 maintains the counterclockwise bias on the pawl as the carrier and pawl return to their first terminal position, thus biasing the advancing pawl operatively as illustrated in FIG. 12.

*Magazine reversing*

Figure 15:
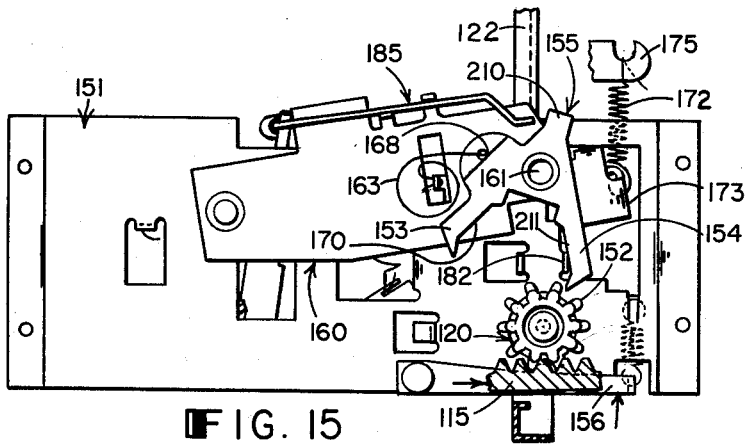
FIG. 15 is a view similar to that of FIG. 12 with the slide transfer carriage in the slide injection position and with the reversing mechanism being actuated to shift the pawl to place the reversing pawl arm in the operative position.

In order for movement of the slide transfer carriage from the slide injection to the slide ejection position to rotate the indexing drive wheel in the opposite direction and feed the magazine in the reverse direction, the reversing pawl arm 154 of the pawl is set for operation and the advancing pawl arm 153 is set in an inactive position by rotation of the indexing pawl from the position shown in FIG. 12 to that shown in FIG. 15. The pawl is shifted by rotation of the pawl in a clockwise direction, as viewed in FIG. 12, sufficiently to place the connecting point 168 above the critical dead-center position between the pivot 161 of the pawl and the portion of the spring bearing against the stud 165 of the base plate. As this critical dead-center point is passed, the biasing influence of the pawl spring is altered and the spring maintains the pawl in the reversing position shown in FIG. 15.

The indexing pawl is shifted to the reversing position by a reversing arrangement from the "reverse" button 20 at the rear of the projector, as shown in FIG. 1, to a pawl push rod 185 which pivots the pawl over-center. As can be seen from FIGS. 2 and 4, when the "reverse" button is depressed, the end of a reverse lever 62 connected to an extension 186 of the button moves inward thus pivoting the lever about its mounting connection 187 on the rear casting. The other end of the lever moves outward, pulling a reversing rod 189. As can best be seen in FIGS. 13 and 16, the end of the rod is connected to a collapsible reversing lever 190 which is the connecting link to the push rod 185. The collapsible lever functions in cooperation with a reverse disabling lever 191 and the slide transfer carriage so as to permit actuation of the "reverse" button to set the indexing pawl for reverse only while the carriage is in the slide injection position. Interruption or interference with the slide changer during a slide changing cycle and possible consequent damage to the projector is therefore prevented.

The body 192 of the collapsible lever 190 pivots about a stud 193 mounted on the base plate 151. The lever has a moveable arm 194 which is pivotally connected to the body of the lever by a pin 195. The push rod 185 is directly connected to one end of the arm by a portion 196 of the rod which passes through the arm. A leaf spring 197 tends to bias the arm with respect to the body so as to pivot the arm away from the body. However, the end 198 of the body contacts the portion 196 of the push rod 185 extending through the arm, and the leaf spring thus causes the body and the moveable arm of the collapsible lever normally to assume the relative positions shown in FIG. 13. A reversing lever spring 199 tends to bias the lever in the clockwise direction as viewed in FIG. 13. The portion 196 of the push rod is jammed between the end of the body of the lever and an edge 200 of the base plate so that the lever normally assumes the position shown in FIG. 13.

When the body of the collapsible lever 190 is pivoted in a counterclockwise direction as viewed in FIG. 13 by actuation of the "reverse" button, the moveable arm 192 of the lever may pivot about the stud 193 with the body of the lever and move the push rod, or it may not move with the body but pivot about its mounting pin. Its action depends on the position of the reverse disabling lever 191. The disabling lever pivots about a stud 205 on the base plate and is biased in a counterclockwise direction as viewed in FIG. 13 by a disabling spring 206. An end of the disabling lever is forced by its spring 206 against a finger 207 of the moveable arm 194 of the collapsible lever. When the disabling lever bears against the finger in this manner, movement of the moveable arm when the body 192 of the lever is pivoted is prevented. The leaf spring 197 which tends to maintain the portion 196 of the push rod 185 in contact with the end 198 of the body of the lever is not sufficiently strong and is overcome by the strength of the disabling spring 206. Therefore, the body of the collapsible lever pivots about the stud and the moveable arm pivots about the pin 195 by which it is mounted on the body and no significant movement of the end of the arm or the push rod takes place.

Figure 16:
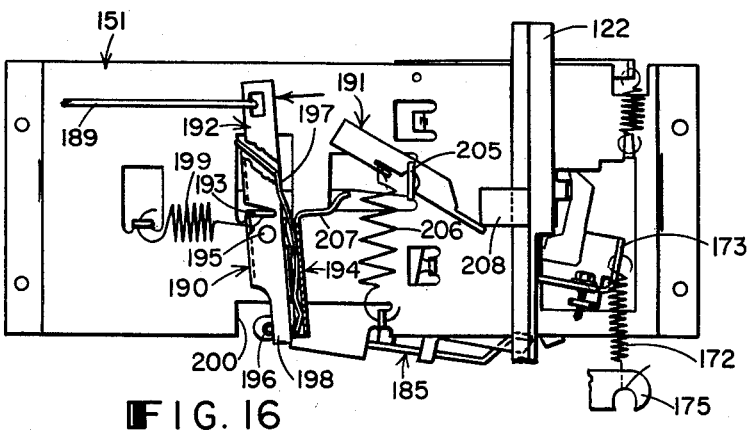
FIG. 16 is a view similar to that of FIG. 13 showing the reverse inactivating mechanism at the same instant in an operating cycle as FIG. 15.

The disabling lever 191 is rendered inactive in order to permit the indexing pawl to be shifted to the reversing position only when the slide transfer carriage is in the slide injection position. As shown in FIG. 16, a boss 208 on the horizontal bar 122 of the carriage contacts the disabling lever and pivots it in the clockwise direction against the action of the disabling spring 206. The boss is located on the bar so that the disabling lever is moved well clear of the finger 207 of the moveable arm when the carriage is in the slide injection position. Thus, when the reversing rod 189 is pulled by actuation of the "reverse" button, the leaf spring 197 exerts sufficient force on the moveable arm 194 that the portion 196 of the push rod continues to bear against the end 198 of the body 192 of the reversing lever. The push rod 185 is thereby shifted generally along the direction of its length and pushes against the top 210 of the indexing pawl 155 as can best be understood from FIG. 15. The strength of the pawl spring 163 is such that it is readily overcome by the leaf spring 197 of the collapsible lever, and the pawl is rotated in a clockwise direction from the advancing position normally assumed as illustrated in FIG. 12.

The push rod moves the pawl sufficiently to pivot the connecting point 168 at which the pawl spring bears on the pawl 155 over-center so that the spring then tends to bias the pawl in the clockwise direction. After the connecting point 168 has been moved beyond the critical dead-center position, the pawl spring 163 biases the reversing pawl arm for operation as shown in FIG. 15 with its inner surface 211 bearing against the second cam 182. The advancing pawl arm is shifted to an inactive position. When the "reverse" button is released, the reversing lever spring 199 causes all the elements of the reversing arrangement including the reversing rod 189 the collapsible lever 190 and the push rod 185 to return to their normal positions as illustrated in FIG. 13 without further affecting the indexing pawl.

Figure 3:
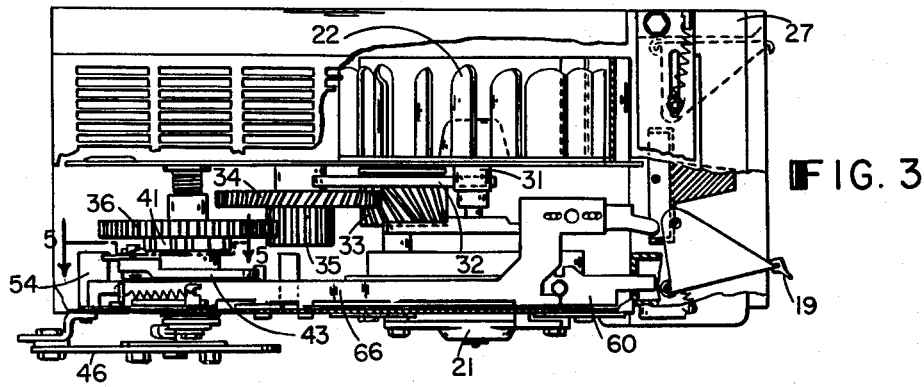
FIG. 3 is a view from the side of the projector with portions removed to show the drive motor, gear train, clutch, and clutch control rods for operating the slide changer.
Figure 4:
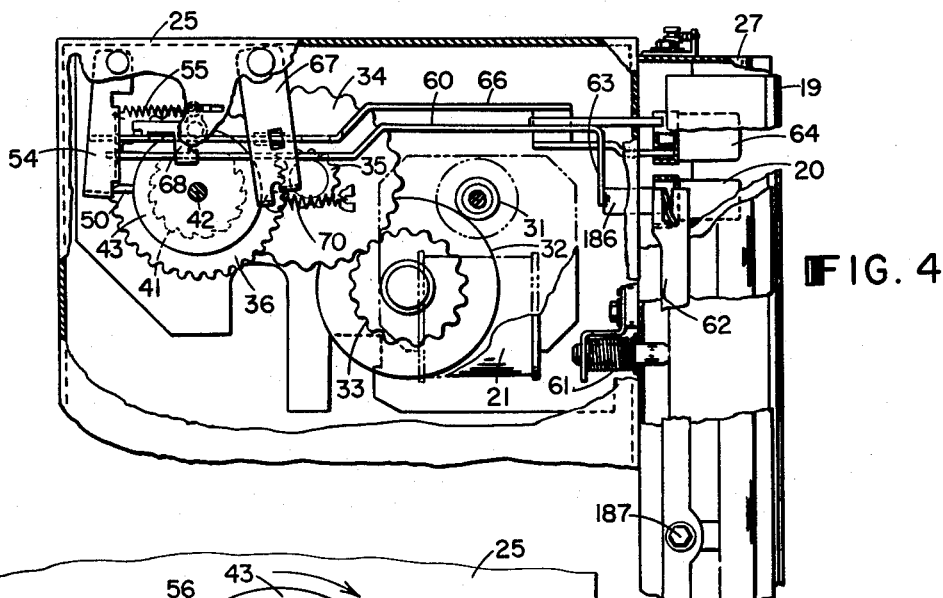
FIG. 4 is a view from the bottom of the projector with portions of the chassis removed in order to show the drive motor, gear train, clutch, and control rods.

Ordinarily when the "reverse" button is depressed, the indexing pawl is shifted to its reverse position as described hereinabove, and the extension 186 of the button pushes against the extension 63 of the change control rod 60, as can be seen from FIGS. 3 and 4, immediately initiating a slide changing cycle. As the slide transfer carriage is moved from the slide injection position to the slide ejection position, the edge 180 on the horizontal bar 122 contacts the arm 173 of the pawl carrier 160 and moves the carrier and the pawl toward the drive wheel. The tip of the reversing pawl arm 154 engages a tooth on the lower set of teeth 152 on the wheel and rotates the wheel one position in the clockwise direction as viewed in FIG. 15. The slide magazine is thereby moved backward toward the rear of the projector a distance of one slide compartment. As the pawl continues to advance, a portion of the inner surface 211 of the reversing pawl arm bears against the second cam 182 thus pivoting the pawl in the counterclockwise direction. The reversing pawl arm is thus disengaged from the teeth on the wheel and further movement of the pawl carries it into position so that the notch 181 in the pawl is engaged by the two cams 171 and 182. The carrier and pawl are moved into the second terminal position shown in FIG. 14 as the carriage reaches the full slide ejection position.

The position of the indexing pawl when the carrier is in the second terminal position after the reversing pawl arm has rotated the drive wheel is exactly the same as the position of the pawl after the advancing pawl arm has rotated the wheel. The pawl is in a neutral position with the arms disengaged from the teeth of the wheel and straddling the wheel. As described hereinabove and as can be seen in FIG. 14 the point of connection 168 of the end of the pawl spring 163 and the pawl is over-center in the counterclockwise direction about the pivot connection of the pawl. Therefore, when the carrier spring 172 is permitted to return the pawl carrier to its first terminal position, the pawl spring rotates the pawl so that the advancing pawl arm is biased for operation, and the carrier and pawl return to the normal position shown in FIG. 12. Thus, the magazine transport mechanism shown and described automatically resets itself to feed the slide magazine in the forward direction during the subsequent operating cycle regardless of the direction of feeding during the previous cycle.

What is claimed is:

1. A slide projector apparatus for selectively reversibly driving a projection slide magazine one slide position comprising a drive wheel mounted for rotation about an axis, a portion of said wheel being adapted for meshing with a portion of a magazine, pawl means comprising an advancing pawl arm and a reversing pawl arm, a portion of said drive wheel being adapted to be engaged by said pawl arms, a carrier on which said pawl means are moveably mounted, biasing means tending to bias the pawl means with respect to the carrier so as to maintain either the advancing pawl arm or the reversing pawl arm in operative position, reversing means for shifting said pawl means with respect to said carrier to remove the advancing pawl arm from an operative position and place the reversing pawl arm in an operative position while the carrier is in a first terminal position, means for moving the carrier from the first terminal position to a second terminal position to cause the pawl arm being biased in an operative position to engage a portion of said drive wheel and rotate the drive wheel through a predetermined angle which moves the magazine one slide position, means for returning the carrier from the second terminal position to the first terminal position, and pawl disengaging means for positioning said pawl means in a neutral position with said pawl arms disengaged from the drive wheel when said carrier is in the second terminal position, said biasing means being adapted to bias the pawl means to place the advancing pawl arms in an operative position when said pawl means is removed from said neutral position by the return of the carrier from the second terminal position toward the first terminal position to ensure a magazine advancing operation during the next cycle of operation of the projector in the absence of a subsequent operation of said reversing means.

2. A slide projector apparatus for selectively reversibly driving a projection slide magazine one slide position comprising a drive wheel mounted for rotation about an axis, means on said drive wheel adapted to engage a mating portion of a slide magazine, drive wheel rotating means comprising an advancing pawl arm and a reversing pawl arm, contact means on said drive wheel adapted to be engaged by said pawl arms for rotating the drive wheel, a carrier on which said wheel rotating means is movably mounted, actuating means for moving the carrier from a first terminal position to a second terminal position to engage the drive wheel with one of said pawl arms and rotate the drive wheel through a predetermined angle which moves the magazine one slide position, means for returning the carrier from the second terminal position to the first terminal position, biasing means tending to bias the drive wheel rotating means with respect to the carrier to urge either the advancing pawl arm or the reversing pawl arm in an operative position to engage the contact means on said drive wheel as the carrier is moved from the first terminal position to the second terminal position and to position the other pawl arm in an inactive position, reversing means for shifting the drive wheel rotating means with respect to the carrier to position the advancing pawl arm in an inactive position and the reversing pawl arm in an operative position, and disengaging means for positioning said drive wheel rotating means in a neutral position with the pawl arms disengaged from the contact means on said drive wheel when said carrier is in the second terminal position, said biasing means being adapted to bias the drive wheel rotating means to place the advancing pawl arm in an operative position and the reversing pawl arm in an inactive position when said carrier is in the first terminal position subsequent to movement of the carrier from the second terminal position to ensure a magazine advancing operation during the next cycle of operation of the projector in the absence of a subsequent operation of said reversing means.

3. A slide projector apparatus for selectively reversibly driving a projection slide magazine one slide position comprising a drive wheel for mating with a slide magazine and adapted to move the magazine through a predetermined distance upon rotation through a predetermined angle about an axis, an advancing pawl arm adapted to engage said drive wheel and rotate the wheel through a predetermined angle in one direction which moves the magazine forwardly one slide position upon movement of the arm from a first terminal position to a second terminal position while the arm is biased operatively, a reversing pawl arm adapted to engage said drive wheel and rotate the wheel through a predetermined angle in the opposite direction which moves the magazine rearwardly one slide position upon movement of the arm from a first terminal position to a second terminal position while the arm is biased operatively, means including biasing means for automatically biasing the advancing pawl arm operatively to effect a magazine advancing operation when moved to said second terminal position thereof and biasing the reversing pawl arm inactively upon return of said pawl arms to said first terminal positions thereof independently of the previous operative or inactive position thereof, reversing means for altering the influence of said biasing means to bias the reversing pawl arm operatively and the advancing pawl arm inactively, actuating means for moving the pawl arms from the first terminal position to the second terminal position wherein the one of said pawl arms biased operatively engages said drive wheel and rotates the drive wheel through a predetermined angle, and withdrawing means for returning the pawl arms from the second terminal position to the first terminal position wherein said biasing means automatically biases the advancing pawl arm operatively and the reversing pawl arm inactively independently of the previous operative or inactive position thereof.

4. A slide projector apparatus for selectively reversibly driving a projection slide magazine one slide position comprising a drive wheel for mating with a slide magazine and adapted to move the magazine through a predetermined distance upon rotation through a predetermined angle about an axis, an advancing pawl arm adapted to engage said drive wheel and rotate the wheel through a predetermined angle in one direction which moves the magazine forwardly one slide position upon movement of the arm from a first terminal position to a second terminal position while the arm is biased operatively, a reversing pawl arm adapted to engage said drive wheel and rotate the wheel through a predetermined angle in the opposite direction which moves the magazine rearwardly one slide position upon movement of the arm from a first terminal position to a second terminal position while the arm is biased operatively, biasing means for normally biasing the advancing pawl arm operatively and the reversing pawl arm inactively, reversing means for altering the influence of said biasing means to bias the reversing pawl arm operatively and the advancing pawl arm inactively, actuating means for moving the pawl arms from the first terminal position to the second terminal position whereby the one of said pawl arms biased operatively engages said drive wheel and rotates the drive wheel through a predetermined angle, disengaging means adapted to position the pawl arms while the arms are in the second terminal position with the arms disengaged from the drive wheel and with the biasing means tending to bias the pawl arms normally, and withdrawing means for returning the pawl arms from the second terminal position to the first terminal position wherein said biasing means biases the advancing pawl arm operatively and the reversing pawl arm inactively independently of the previous operative or inactive position thereof.

5. A slide projector apparatus for selectively reversibly driving a projection slide magazine one slide position comprising a drive wheel mounted for rotation about an axis, means on said drive wheel adapted to engage a mating portion of a slide magazine whereby rotation of said drive wheel through a predetermined angle moves the slide magazine a predetermined distance, a drive wheel rotating pawl having an advancing pawl arm and a reversing pawl arm, a carrier on which said pawl is rotatably mounted, contact means on said drive wheel adapted to be engaged by the advancing pawl arm for rotating the drive wheel in one direction which moves the magazine forwardly one slide position and adapted to be engaged by the reversing pawl arm for rotating the drive wheel in the opposite direction which moves the magazine forwardly one slide position, actuating means for moving the carrier from a first terminal position to a second terminal position to engage the contact on said drive wheel with one of said pawl arms and rotate the drive wheel through a predetermined angle, a biasing spring pushing against a portion of said pawl and adapted to bias the pawl in one direction when the pawl is rotated to position the point over-center in the one direction and adapted to bias the pawl in the opposite direction when the pawl is rotated to place the point over-center in the opposite direction, said advancing pawl arm being adapted to engage said contact means and rotate the drive wheel upon movement of the carrier from the first terminal position to the second terminal position and said reversing pawl arm being inactive when said pawl is biased in the one direction, said reversing pawl arm being adapted to engage said contact means and rotate the drive wheel upon movement of the carrier from the first terminal position to the second terminal position and said advancing pawl being inactive when said pawl is biased in the opposite direction, reversing means for rotating the pawl with respect to the carrier to position the point on the pawl over-center in the opposite direction when the carrier is in the first terminal position, and camming means adapted to rotate the pawl to disengage the pawl arms from the contact on the drive wheel and to position the point on the pawl over-center in the one direction as the carrier is moved into the second terminal position independently of the previous position of the pawl wherein the advancing pawl arm will be in an operative position to effect a magazine advancing operation when the carrier is returned to said first terminal position.

6. In a slide projector having an optical train for projecting an image of a transparent slide, a gate across said train for supporting a slide therein, a slide transfer means for moving a slide from a magazine to the gate when moved in one direction from a reference position which clears the magazine to a slide projection position and returning the slide from the gate to the magazine when moved in the opposite direction back to said reference position, and actuating means for alternately moving the transfer means in one direction into a projecting position and in the opposite direction into said reference position, apparatus for selectively reversibly driving a slide magazine comprising drive means for engaging a portion of the magazine, advancing means normally operated by movement of said transfer means into said reference position for operating said drive means to drive the magazine in the forward direction, reversing means operated by movement of said transfer means into said reference position for operating said drive means to drive the magazine in the forward direction, reversing means operated by movement of said transfer means into said reference position for operating said drive means to drive the magazine in the reverse direction, shifting means for de-activating the advancing means and activating said reversing means, and disabling means for preventing operation of said shifting means except when the slide transfer means is in said projection position.

7. In a slide projector having an optical train for projecting an image of a transparent slide, a gate across said train for supporting a slide therein, a slide transfer means for moving a slide from a magazine to the gate when moved in one direction from a reference position which clears the magazine to a slide projection position and returning the slide from the gate to the magazine when moved in the opposite direction back to said reference position, and actuating means for alternately moving the transfer means in one direction into a projecting position and in the opposite direction into said reference position, apparatus for selectively reversibly driving a slide magazine comprising drive means for engaging a portion of the magazine, advancing means normally operated by movement of said transfer means into said reference position for operating said drive means to drive the magazine in the forward direction, reversing means operated by movement of said transfer means into said reference position for operating said drive means to drive the magazine in the reverse direction, biasing means normally biasing the advancing means operatively and the reversing means inoperatively, shifting means for causing the biasing means to bias the reversing means operatively and the advancing means inoperatively, and disabling means for preventing operation of said shifting means except when said slide transfer means is in said projecting position.

8. In a slide projector having an optical train for projecting an image of a transparent slide and a gate across said train for supporting a slide therein, the combination including a slide transfer means for moving a slide from a magazine to the gate and returning a slide from the gate to the magazine, actuating means for alternately positioning said transfer means in a first position to place a slide in said gate and in a second position to return a slide to the magazine, drive means for engaging a portion of a magazine, advancing means for operating said drive means to drive the magazine in the forward direction, reversing means for operating said drive means to drive the magazine in the reverse direction, means for activating the advancing means and inactivating the reversing means, shifting means for inactivating the advancing means and activating the reversing means, disabling means normally engageable with said shifting means for preventing operation of said shifting means, and an element on said slide transfer means engageable with said disabling means while the transfer means is in said first position to remove said disabling means from engagement with said shifting means thereby to permit operation of the shifting means.

9. In a slide projector having an optical train for projecting an image of a transparent slide and a gate across said train for supporting a slide therein, the combination including a slide transfer means for moving a slide from a magazine to the gate and returning a slide from the gate to the magazine, actuating means for alternately positioning said transfer means in a first position to place a slide in said gate and in a second position to return a slide to the magazine, drive means for engaging a portion of a magazine, advancing means for operating said drive means to drive the magazine in the forward direction, reversing means for operating said drive means to drive the magazine in the reverse direction, means for activating the advancing means and inactivating the reversing means, a shifting lever, an arm mounted on said lever for movement with respect thereto, a first portion of a shifting means connected to said lever for moving said lever, a second portion of the shifting means connected to said arm and adapted to be moved by movement of the arm so as to inactivate the advancing means and activate the reversing means, resilient means on said lever for causing said arm to move when said lever is moved, a disabling element, biasing means for normally biasing said disabling element into engagement with said arm so as to overcome said resilient means and prevent movement of the arm when said lever is moved, and an element on said slide transfer means engageable with said disabling element while the transfer means is in said first position to overcome said biasing means and remove the disabling element from engagement with the arm thereby to permit the arm to move when the lever is moved.

10. In a slide projector having an optical train for projecting an image of a transparent slide and a gate across said train for supporting a slide therein, the combination including a slide transfer carriage for moving a slide from a magazine to the gate and returning a slide from the gate to the magazine, carriage actuating means for alternately positioning said carriage in a slide injection position to place a slide in said gate and in a slide ejection position to return a slide to the magazine, a support, a drive wheel mounted on said support for rotation about an axis, means on said drive wheel adapted to engage a mating portion of a slide magazine whereby rotation of said drive wheel through a predetermined angle moves the slide magazine a predetermined distance, a drive wheel rotating pawl having an advancing pawl arm and a reversing pawl arm, contact means on said drive wheel adapted to be engaged by the advancing pawl arm for rotating the drive wheel in one direction and adapted to be engaged by the reversing pawl arm for rotating the drive wheel in the opposite direction, biasing means adapted to bias the pawl in one direction when the pawl is rotated beyond a critical position in the one direction and adapted to bias the pawl in the opposite direction when the pawl is rotated beyond a critical position in the opposite direction, said advancing pawl arm being in an operative position for rotating the drive wheel in one direction and said reversing pawl arm being in an inactive position when the said pawl is biased in the one direction, said reversing pawl arm being in an operative position for rotating the drive wheel in the opposite direction and said advancing pawl arm being in an inactive position when said pawl is biased in the opposite direction, a shifting lever pivotally mounted on said support, an arm pivotally mounted on said lever for movement with respect thereto, a push rod having one end connected to said arm and the other end positioned adjacent said drive wheel pawl so as to rotate the pawl beyond the critical position in the opposite direction upon movement of the arm toward the pawl, resilient means on said lever for causing said arm to move with said lever when said lever is pivoted with respect to the support, reversing means for pivoting said lever with respect to the support in a direction tending to move the arm toward the pawl, a disabling lever pivotally mounted on said support, disabling lever biasing means for normally biasing the disabling lever into engagement with said arm so as to overcome said resilient means and prevent movement of the arm when the shifting lever is pivoted by said reversing means, and an element on said slide transfer carriage engageable with the disabling lever while the carriage is in the slide injection position to overcome the disabling lever biasing means and pivot the disabling lever so as to remove the disabling lever from engagement with the arm thereby to permit the arm to move when the shifting lever is pivoted by said reversing means.

References Cited by the Examiner

UNITED STATES PATENTS

| | | | |
|---|---|---|---|
| 2,874,497 | 2/59 | Huff et al. | 88—28 |
| 3,020,774 | 2/62 | Kullmann | 74—157 |
| 3,023,669 | 3/62 | Hall | 88—28 |

FOREIGN PATENTS 1,106,520  5/61  Germany.

NORTON ANSHER, *Primary Examiner.*

EMIL G. ANDERSON, *Examiner.*